(12) United States Patent
Nishi

(10) Patent No.: US 10,241,489 B2
(45) Date of Patent: Mar. 26, 2019

(54) CONTROL DEVICE AND DIAGNOSIS-INFORMATION RECORDING/DISPLAYING DEVICE

(71) Applicant: FANUC Corporation, Minamitsuru-gun, Yamanashi (JP)

(72) Inventor: Tohru Nishi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 212 days.

(21) Appl. No.: 14/969,129

(22) Filed: Dec. 15, 2015

(65) Prior Publication Data

US 2016/0179072 A1   Jun. 23, 2016

(30) Foreign Application Priority Data

Dec. 19, 2014   (JP) ................................ 2014-257501

(51) Int. Cl.
G05B 19/042 (2006.01)

(52) U.S. Cl.
CPC .. G05B 19/0425 (2013.01); *G05B 2219/2612* (2013.01)

(58) Field of Classification Search
CPC ...................... H04B 14/064; G05B 2219/2612
USPC ............................................ 700/83; 375/243
See application file for complete search history.

(56) References Cited

U.S. PATENT DOCUMENTS

| | | | | |
|---|---|---|---|---|
| 3,906,367 A | * | 9/1975 | Hoeschele, Jr. ..... | H04B 14/064 375/243 |
| 9,148,001 B1 | * | 9/2015 | Mohanty ................. | H02G 3/00 |
| 2003/0045946 A1 | | 3/2003 | Hattori et al. | |
| 2003/0056036 A1 | * | 3/2003 | Carlton ................. | G06F 11/221 710/15 |
| 2007/0283076 A1 | * | 12/2007 | Kim ....................... | G06F 13/385 710/315 |
| 2011/0128712 A1 | * | 6/2011 | Prest ...................... | G06F 1/1626 361/783 |
| 2013/0279860 A1 | * | 10/2013 | Hung ...................... | G02B 6/43 385/89 |
| 2016/0187963 A1 | * | 6/2016 | Leinonen ............ | H04L 12/6418 710/313 |
| 2018/0005207 A1 | * | 1/2018 | Wade ........................ | G06F 1/26 |

FOREIGN PATENT DOCUMENTS

| | | |
|---|---|---|
| JP | 2000-163117 A | 6/2000 |
| JP | 2003-069731 A | 3/2003 |
| JP | 2011-039684 A | 2/2011 |
| JP | 2012-194630 A | 10/2012 |
| JP | 2014-032559 A | 2/2014 |

OTHER PUBLICATIONS

Notification of Reasons for Refusal dated Mar. 7, 2017 in Japanese Patent Application No. 2014-257501 (4 pages) with an English translation (4 pages).

* cited by examiner

*Primary Examiner* — Emilio J Saavedra
(74) *Attorney, Agent, or Firm* — Drinker Biddle & Reath LLP

(57) ABSTRACT

A control device includes a diagnosis-information output circuit constituted by a condition monitoring circuit, a condition determining circuit, a condition-controlling-signal monitoring circuit, an output-information generating circuit that generates diagnosis information indicating a condition of the control device, and a condition controlling circuit that changes a signal in the control device in response to a signal for controlling the control device.

2 Claims, 4 Drawing Sheets

FIG. 4A

| 01011010 | 00000010 | 10001010 | 00000000 | xxxxxxxx |
|---|---|---|---|---|
| 5Ah | 02h | 8Ah | 00h | xxh |
| Header | NUMBER OF DIAGNOSIS CODES | DIAGNOSIS CODE 1 | DIAGNOSIS CODE 2 | CHECKSUM CODE OR CRC CODE |

FORMAT OF DIAGNOSIS INFORMATION

EX. 1: DATA STRING 5Ah, 02h, 01h, 00h, 5Dh → NOTIFY CPU IS BEING INITIALIZED
EX. 2: DATA STRING 5Ah, 02h, 18h, 00h, C2h → NOTIFY MEMORY IS BEING CHECKED

FIG. 4B

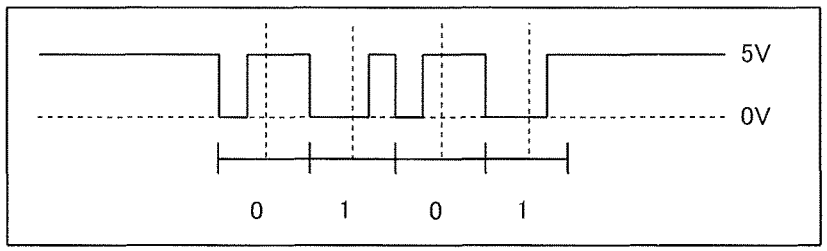

ELECTRICAL OUTPUT OF DIAGNOSIS INFORMATION

FIG. 5

| 01011010 | 00000010 | 00000001 | 00000000 | xxxxxxxx |
|---|---|---|---|---|
| A5h | 02h | 01h | 00h | xxh |
| Header | PARAMETER 1 | PARAMETER 1 | PARAMETER 2 | CHECKSUM CODE OR CRC CODE |

FORMAT OF RESPONSE TO DIAGNOSIS INFORMATION

CONTROL DEVICE AND DIAGNOSIS-INFORMATION RECORDING/DISPLAYING DEVICE

RELATED APPLICATION DATA

This application claims priority under 35 U.S.C. § 119 and/or § 365 to Japanese Application No. 2014-257501 filed Dec. 19, 2014, the entire contents is incorporated herein by reference.

BACKGROUND OF THE INVENTION

Field of the Invention

The present invention relates to output of maintenance diagnosis information and a diagnostic-information display device, and more particularly, to a control device that outputs maintenance diagnosis information and a diagnosis-information recording/displaying device in which the maintenance diagnosis information can be output and displayed even when a CPU does not operate.

Description of the Related Art

As a method of displaying the operation condition or the failure condition of a control device at startup on a lamp or the like to offer the condition to users by showing a number or using an LED, a 7-segment LED display of a post (Power On Self Test) code on a personal computer has been widely known, for example.

The above method requires a display device dedicated for displaying the operation condition or the failure condition at startup. Since a 7-segment LED for maintenance or the like is usually unused, an extra cost is required. Further, since a 7-segment LED for maintenance is unused in a usual state, the 7-segment LED is set out of sight and it takes time to open a case or the like to check the 7-segment LED.

As a conventional technique for solving the above problems, a technique of outputting an operation condition using a general-purpose interface is disclosed (for example, Japanese Patent Laid-Open No. 2011-039684).

However, a general-purpose interface that is commonly used usually needs a complicated control circuit. Accordingly, such an interface cannot be used when the interface does not normally operate, when the initialization is uncompleted (for example, immediately after power is supplied), or when a CPU does not operate. Even in the technique disclosed in Japanese Patent Laid-Open No. 2011-039684, a CPU needs to operate in order to control the general-purpose interface although the operation condition can be output to the general-purpose interface. Accordingly, an operation condition or a failure condition at startup cannot be displayed when a CPU does not operate.

SUMMARY OF THE INVENTION

Therefore, an object of the present invention is to output maintenance diagnosis information that can be output and displayed even when a CPU does not operate and provide a diagnosis-information display device.

A control device according to the present invention is a control device with a first general-purpose interface to be connected with an external device. The control device includes a diagnosis-information output circuit including a condition monitoring circuit that receives and holds signals including at least an enable signal, a timing signal, a reset signal, and a clock signal required for diagnosis of an operation condition of the control device, a condition determining circuit that determines a condition of the control device based on the signals held by the condition monitoring circuit in response to the signals, a condition-controlling-signal monitoring circuit that outputs a signal for controlling the control device in response to a signal required for controlling the control device from outside of the control device, an output-information generating circuit that generates diagnosis information indicating the condition of the control device based on a condition determination result by the condition determining circuit and the signal for controlling the control device received from the condition-controlling-signal monitoring circuit, a first output circuit that converts the diagnosis information generated by the output-information generating circuit into an electrical signal and outputs the electrical signal, and a condition controlling circuit that changes a signal in the control device in response to the signal for controlling the control device. The control device outputs an electrical signal output from the first output circuit to outside of the control device via a power-supply interface included in the first general-purpose interface, and receives a control signal from outside of the control device via the power-supply interface included in the first general-purpose interface to change the signal in the control device.

A diagnosis-information recording/displaying device according to the present invention is a diagnosis-information recording/displaying device with a second general-purpose interface to be connected with the control device. The diagnosis-information recording/displaying device includes an input circuit that receives and holds an electrical signal indicating a condition of the control device output by the control device, a condition restoring circuit that restores diagnosis information indicating the condition of the control device in response to an electrical signal from the input circuit, a communication controlling circuit that controls output of the diagnosis information having been received from the condition restoring circuit to an external device and input of a signal for controlling the control device from the external device, an input/output circuit that outputs the diagnosis information having received from the condition restoring circuit to the external device in accordance with control by the communication controlling circuit and receives and holds the signal for controlling the controlling the control device from the external device, a condition-controlling-information generating circuit that generates response information for transmitting the signal for controlling the control device in response to a control signal from the input/output circuit, and a second output circuit that converts the response information from the condition-controlling-information generating circuit into an electrical signal and outputs the electrical signal. The diagnosis-information recording/displaying device receives an electrical signal from the input circuit via a power-supply interface included in the second general-purpose interface, and outputs an electrical signal output from the second output circuit via the power-supply interface included in the second general-purpose interface.

In the present invention, the above configuration allows maintenance diagnosis information to be output easily as an electrical signal even when a CPU does not operate. Further, since maintenance diagnosis information is output to an interface that can be easily used by general users, the devices according to the present invention can be easily used without opening a case. Accordingly, the usability is improved.

BRIEF DESCRIPTION OF THE DRAWINGS

The above object or other objects and characteristics of the present invention will be clear from the following descriptions of an embodiment with reference to the attached drawings. Of the drawings:

FIGS. 4A and 4B are diagrams illustrating examples of diagnosis information in the embodiment of the present invention;

FIG. 5 is a diagram illustrating an example of response information in the embodiment of the present invention.

DETAILED DESCRIPTION OF THE PREFERRED EMBODIMENTS

The present invention provides a method of outputting and acquiring maintenance diagnosis information easily as an electrical signal by using an interface for general users such as a USB port. Maintenance diagnosis information can be output easily as an electrical signal using a power-supply pin and a GND pin of a general-purpose interface. Accordingly, maintenance diagnosis information can be output even when a CPU does not operate.

Figure 1:
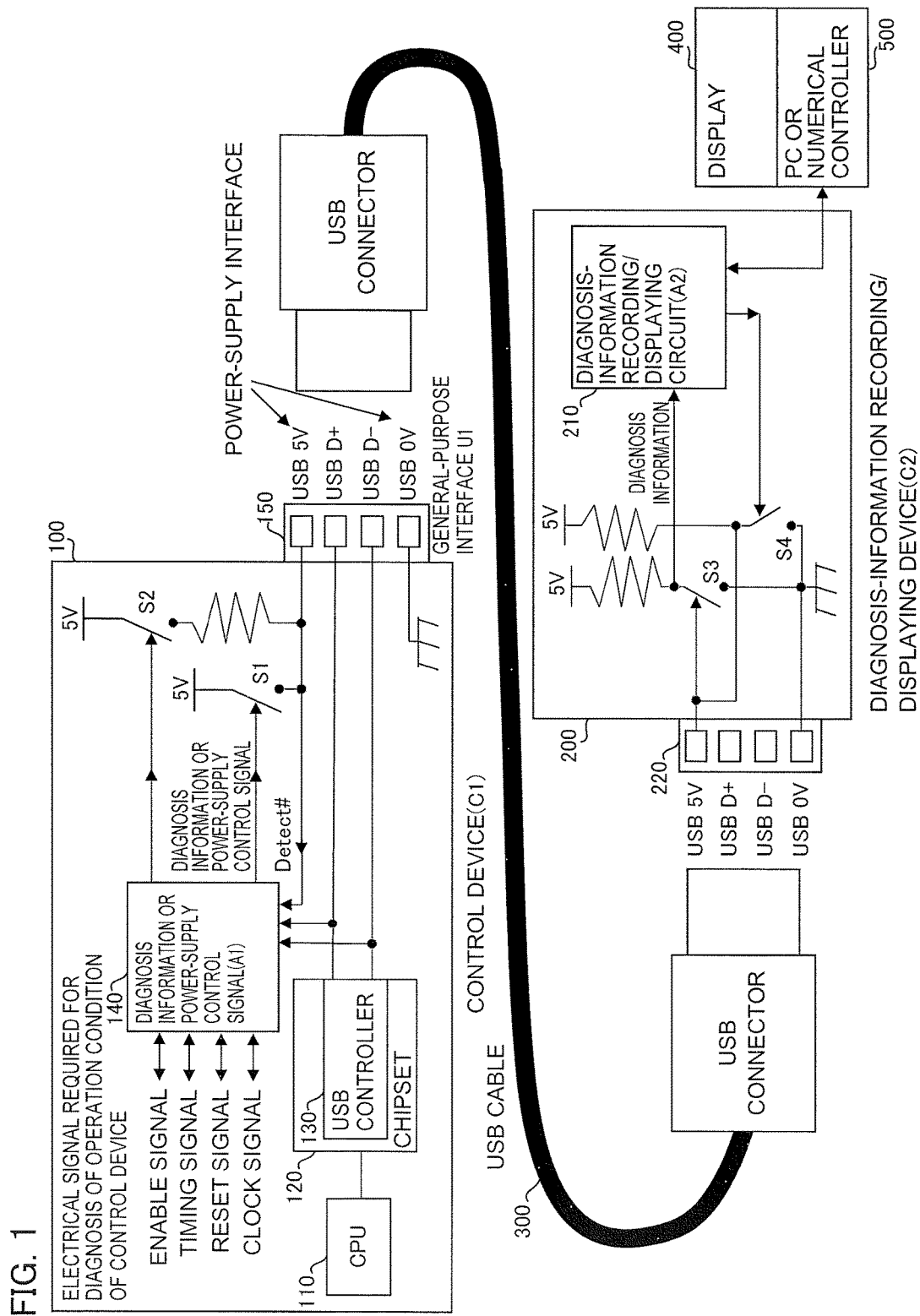
FIG. 1 is a block diagram of main parts of a control device and a diagnosis-information recording/displaying device in an embodiment of the present invention.

FIG. 1 is a block diagram of main parts of a control device and a diagnosis-information recording/displaying device in an embodiment of the present invention.

A control device of the present embodiment includes a CPU 110 and a chipset 120 that control the operation of a whole control device 100, a diagnosis-information output circuit 140, and a general-purpose interface 150 such as a USB. An external device such as a USB device is usually connected to the general-purpose interface 150, and the general-purpose interface 150 is controlled by a USB controller 130 in the chipset 120 in response to an instruction from the CPU 110.

The diagnosis-information output circuit 140 monitors whether a problem occurs by reading electrical signals such as an enable signal, a timing signal, a reset signal, and a clock signal in the control device 100, and determines the operation condition or failure condition of the control device 100 at startup based on the information in the electrical signals. The diagnosis-information output circuit 140 generates maintenance diagnosis information based on the determination result and controls a switch S1 to output the diagnosis information as an electrical signal to the outside of the control device 100 via a power-supply interface (a power-supply pin and a GND pin) of the general-purpose interface 150.

Furthermore, the diagnosis-information output circuit 140 controls a switch S2 to set the power-supply interface to a power-supply pulling-up mode to enter a signal input mode, and detects a response signal Detect# from an external diagnosing circuit.

Moreover, the diagnosis-information output circuit 140 monitors whether a usual external device other than a diagnosis-information recording/displaying device 200 is connected to the general-purpose interface 150 by reading data pins (a D+ pin and a D− pin) of the general-purpose interface 150 and controls the output of output information based on the monitoring result.

The diagnosis-information recording/displaying device 200 includes a diagnosis-information recording/displaying circuit 210 and a general-purpose interface 220 such as a USB interface. The diagnosis-information recording/displaying device 200 is used by being connected to the control device 100 via a cable 300 such as a USB cable. The diagnosis-information recording/displaying device 200 differs from usual external devices. The diagnosis-information output circuit 140 of the control device 100 can distinguish usual external devices from the diagnosis-information recording/displaying device 200 by detecting that data pins (a D+ pin and a D− pin) of the general-purpose interface 220 are not connected. A personal computer or numerical controller 500 including a display 400 is connected to the diagnosis-information recording/displaying circuit 210.

The diagnosis-information recording/displaying circuit 210 monitors a power-supply interface (a power-supply pin and a GND pin) of the general-purpose interface 220, analyzes an electrical signal input via the power-supply interface, and acquires control-device diagnosis information generated by the control device 100. The acquired diagnosis information is output to the personal computer or numerical controller 500 and displayed on the display 400 in the personal computer or numerical controller 500. Thereby, a user is notified of the diagnosis information.

The diagnosis-information recording/displaying circuit 210 controls a switch S4 as needed to generate a response signal Detect# to the diagnosis information and outputs the response signal Detect# to the diagnosis-information output circuit 140 of the control device 100 via the power-supply interface of the general-purpose interface 220.

Figure 2:
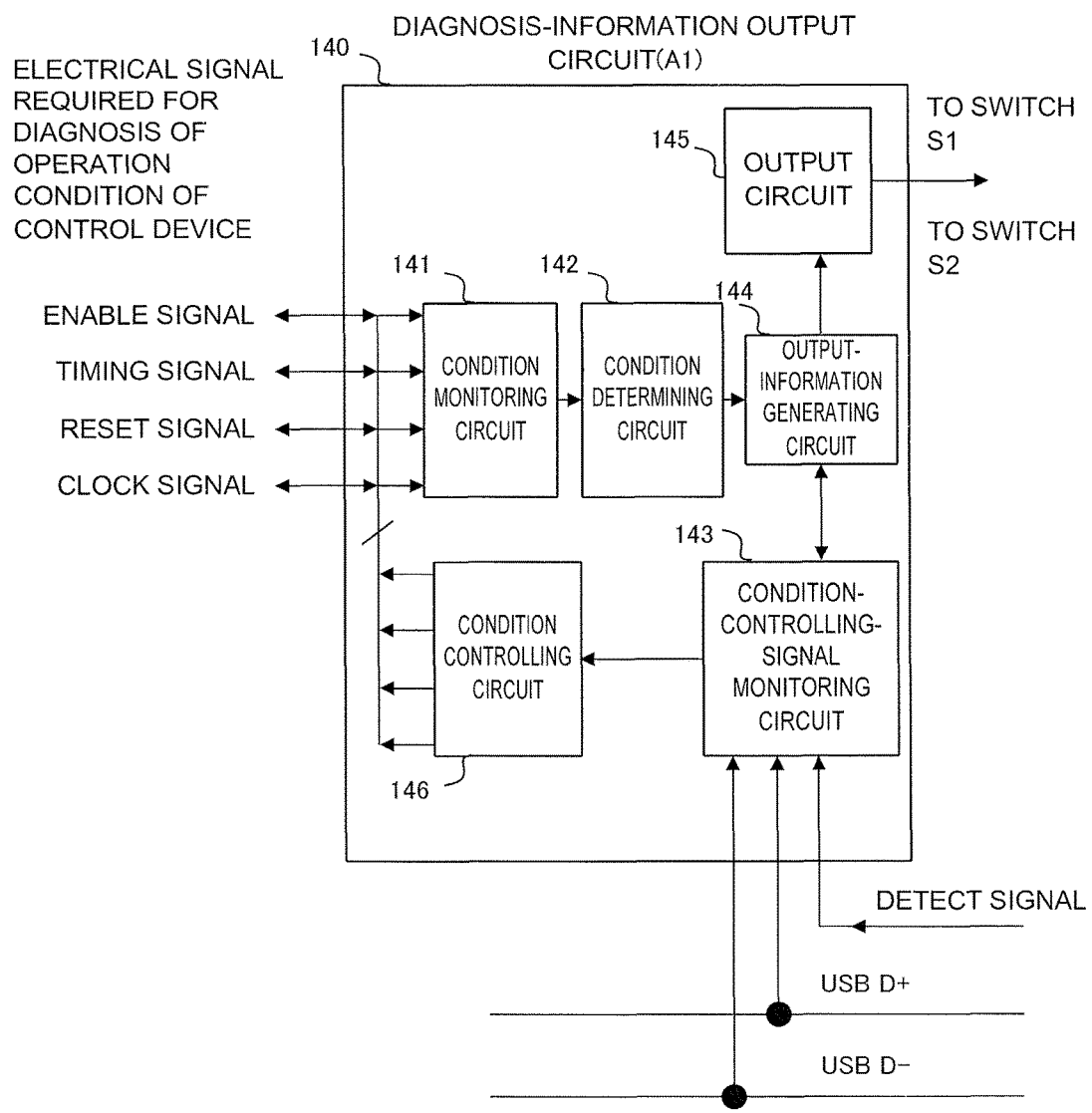
FIG. 2 is a function block diagram of a diagnosis-information output circuit in the embodiment of the present invention.

FIG. 2 is a function block diagram of the diagnosis-information output circuit 140 in the present embodiment.

The diagnosis-information output circuit 140 includes a condition monitoring circuit 141, a condition determining circuit 142, a condition-controlling-signal monitoring circuit 143, an output-information generating circuit 144, an output circuit 145, and a condition controlling circuit 146.

The condition monitoring circuit 141 has a role to receive and hold electrical signals required for diagnosis of the operation condition of the control device 100 such as an enable signal, a timing signal, a reset signal, and a clock signal. The condition determining circuit 142 determines the condition of the control device 100 based on the condition of electrical signals held by the condition monitoring circuit 141. The condition-controlling-signal monitoring circuit 143 acquires the operation condition of the general-purpose interface 150, receives a signal required for controlling the control device 100 from the outside of the diagnosis-information output circuit 140, and outputs a signal for controlling the operation of the control device 100.

The output-information generating circuit 144 generates diagnosis information that indicates the condition of the control device 100 based on the condition determination result determined by the condition determining circuit 142 and a control signal input from the condition-controlling-signal monitoring circuit 143. The output circuit 145 converts diagnosis information indicating the condition of the control device 100 generated by the output-information generating circuit 144 into an electrical signal and outputs the electrical signal to the outside of the diagnosis-information output circuit 140.

The condition controlling circuit 146 changes electrical signals in the control device 100 based on the control signal input from the condition-controlling-signal monitoring circuit 143.

Figure 3:
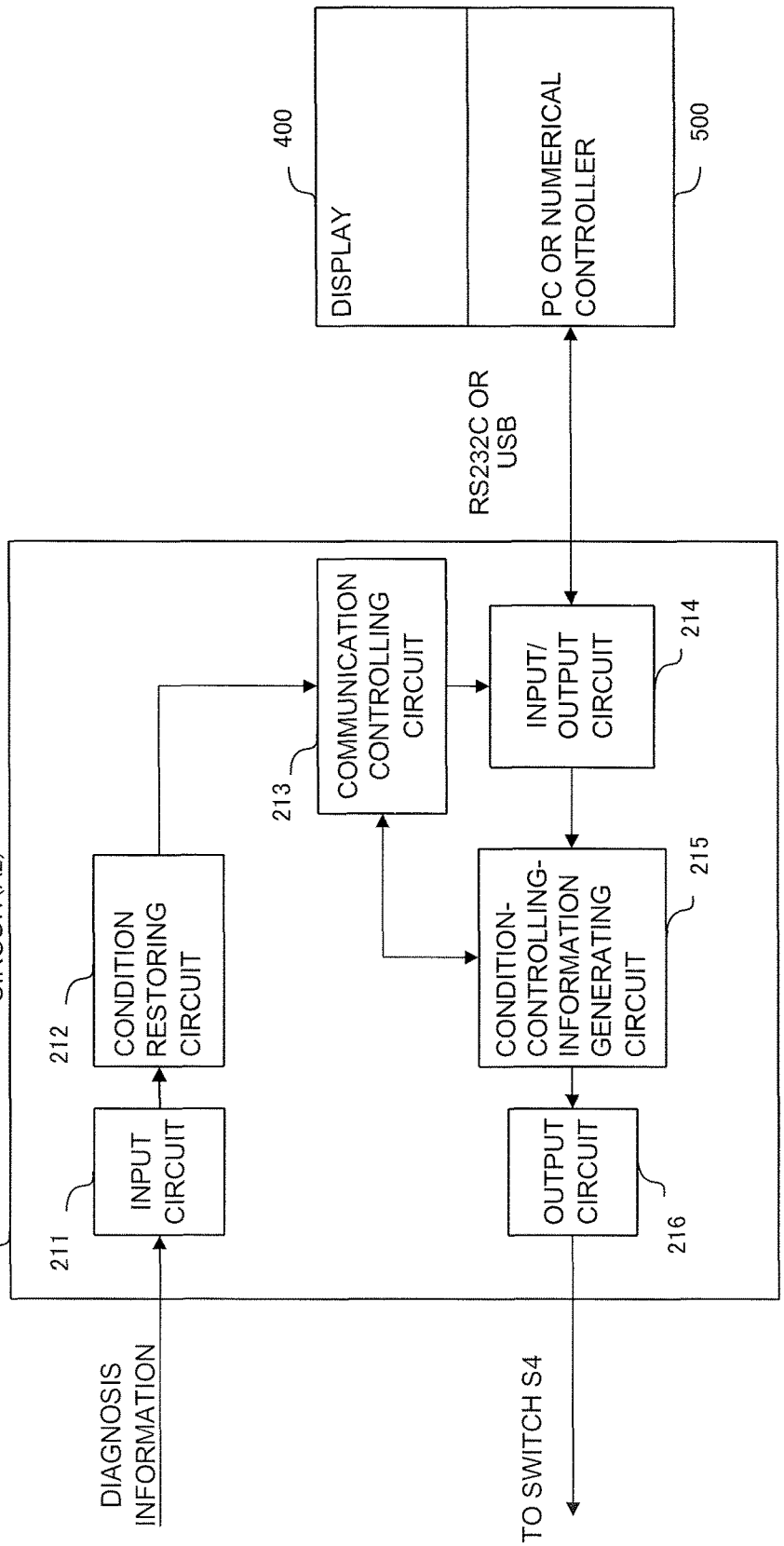
FIG. 3 is a function block diagram of a diagnosis-information recording/displaying circuit in the embodiment of the present invention.

FIG. 3 is a function block diagram of the diagnosis-information recording/displaying circuit 210 in the present embodiment.

The diagnosis-information recording/displaying circuit 210 includes an input circuit 211, a condition restoring circuit 212, a communication controlling circuit 213, an input/output circuit 214, a condition-controlling-information generating circuit 215, and an output circuit 216.

The input circuit 211 receives and holds diagnosis information indicating the condition of the control device 100 that is output as an electrical signal from the control device 100. The condition restoring circuit 212 restores diagnosis information indicating the condition of the control device 100 from an electrical signal held by the input circuit 211. The communication controlling circuit 213 controls the input/output circuit 214 based on diagnosis information indicating the condition of the control device 100 received from the condition restoring circuit 212 and a control signal received from the condition-controlling-information generating circuit 215 to control communication between the input/output circuit 214 and the personal computer or numerical controller 500, which includes transmission of diagnosis information indicating the condition of the control device 100 or reception of a control signal for the control device 100.

The condition-controlling-information generating circuit 215 receives a control signal via the input/output circuit 214 and generates response information for transmitting the control signal to the control device 100 based on the control signal. The output circuit 216 converts response information generated by the condition-controlling-information generating circuit 215 into an electrical signal and outputs the electrical signal to the outside of the diagnosis-information recording/displaying circuit 210 via the power-supply interface of the general-purpose interface 220.

FIGS. 4A and 4B are diagrams illustrating examples of diagnosis information output from the control device 100 in the present embodiment. As illustrated in FIG. 4A, diagnosis information in the present embodiment includes a header indicating the information is diagnosis information, the number of diagnosis codes, a plurality of diagnosis codes, and a CRC code. What information the values of the diagnosis codes indicate is determined as appropriate depending on the specification of the control device.

Diagnosis information in the present embodiment is subject to M code, pulse width modulation, frequency modulation and the like based on the bit string of the diagnosis information, is converted into signals of "0" or "1" electrically and is output as electrical signals from the control device 100 via the power-supply interface of the general-purpose interface 150. FIG. 4B illustrates an example of electrical output of diagnosis information in which the diagnosis information is shown by "0" or "1" by changing the pulse phase by the pulse width modulation.

FIG. 5 is a diagram illustrating an example of response information to diagnosis information to be output from the diagnosis-information recording/displaying device 200 in the present embodiment. As illustrated in FIG. 5, response information to diagnosis information in the present embodiment includes a header indicating that the information is response information, the number of parameters, a plurality of parameters, and a CRC code. For example, when a parameter 1 is "01 h", the response information indicates that the diagnosis information is normally received. When the parameter 1 is "02h", the response information indicates that the diagnosis information is abnormal and requests retransmission of diagnosis information. Furthermore, since control information for controlling the control device 100 is set as parameters, a control signal can be also transmitted from the diagnosis-information recording/displaying device 200 side to the control device 100.

Similarly to diagnosis information, response information to diagnosis information in the present embodiment is subject to M code, pulse width modulation, frequency modulation and the like based on the bit string of the response information, is converted into signals of "0" or "1" electrically and is output as electrical signals from the diagnosis-information recording/displaying device 200 via the power-supply interface of the general-purpose interface 220.

On the control device 100 having the above configuration, the startup processing is performed in accordance with the following procedures.

[Step SA01] After the power supply starts and the internal reset is released, the power supply of an external port is output (the switch S1 is turned on) and 5 V is output to the power-supply pin (a USB, 5 V) of the general-purpose interface 150.

[Step SA02] Whether a voltage is applied to the data pins (a USB D+ and a USB D−) of the general-purpose interface 150 is detected.

[Step SA03] When a voltage is applied to the data pins at step SA02, it is determined that a usual external device is connected to the general-purpose interface 150 and the processing advances to step SA09. Otherwise, the processing advances to step SA04.

[Step SA04] Whether an internal operation is abnormal (for example, no signal is output within a prescribed time) by monitoring the condition of an electrical signal required for diagnosis of the operation condition of the control device. When the internal operation is not abnormal, the processing returns to step SA02. When the internal operation is abnormal, diagnosis information indicating the abnormal condition is converted into an electrical signal and the electrical signal is output to the diagnosis-information recording/displaying device 200 (the switch S1 is controlled) using the power-supply pin (the USB, 5V) of the general-purpose interface 150.

[Step SA05] When the output of the electrical signal has been completed, the power-supply pin is powered off (the switch S1 is turned off) to switch the power-supply pin to the power-supply pulling up (the switch S2 is turned on).

[Step SA06] That the power-supply pin is driven is awaited from the diagnosis-information recording/displaying device 200 (whether Detect# is activated is monitored).

[Step SA07] When that the power-supply pin is driven to be Low is received from the diagnosis-information recording/displaying device 200, bidirectional communication is performed and a diagnosis operation (for example, reception of a response signal, retransmission of diagnosis information, and control of the control device 100 based on a control signal) is performed.

[Step SA08] At the time of the completion of the communication, the operation of the diagnosis-information output circuit 140 is stopped.

[Step SA09] No diagnosis information is output and the operation of the diagnosis-information output circuit 140 is stopped.

The embodiment of the present invention has been described above. However, the present invention is not limited to the above embodiment. The present invention can be achieved in other embodiments by being modified as appropriate.

The invention claimed is:

1. A control device with a first general-purpose interface comprising a power-supply pin, a ground pin, and a data pin to be connected with an external device, the control device comprising:
   a diagnosis-information output circuit that includes
   a condition monitoring circuit that receives and holds diagnostic signals required for diagnosis of an operation condition of the control device,
   a condition determining circuit that determines a condition of the control device based on the diagnostic signals held by the condition monitoring circuit,
   a condition-controlling-signal monitoring circuit that outputs a control signal for controlling the control device in response to an external signal required for controlling the control device from outside of the control device,
   an output-information generating circuit that generates diagnosis information indicating the condition of the control device based on a condition determination result by the condition determining circuit and the control signal received from the condition-controlling-signal monitoring circuit,
   a first output circuit that converts the diagnosis information generated by the output-information generating circuit into an electrical signal representing the diagnosis information and outputs the electrical signal, and
   a condition controlling circuit that changes a signal in the control device in response to the control signal, wherein
   the control device outputs the electrical signal output from the first output circuit to outside of the control device via the power-supply pin and/or the ground pin included in the first general-purpose interface, and receives the external signal from outside of the control device via the power-supply pin and/or the ground pin included in the first general-purpose interface to change the control signal in the control device.

2. A diagnosis-information recording/displaying device with a second general-purpose interface comprising a second power-supply pin, a second ground pin, and a second data pin to be connected with the control device according to claim 1, the diagnosis-information recording/displaying device comprising:
   an input circuit that receives and holds the electrical signal indicating a condition of the control device output by the first output circuit of the control device;
   a condition restoring circuit that restores diagnosis information indicating the condition of the control device in response to the electrical signal from the input circuit;
   a communication controlling circuit that controls output of the diagnosis information received from the condition restoring circuit to an external device and input of a second external signal for controlling the control device from the external device;
   an input/output circuit that outputs the diagnosis information received from the condition restoring circuit to the external device in accordance with control by the communication controlling circuit, and receives and holds the second external signal for controlling the control device from the external device;
   a condition-controlling-information generating circuit that generates response information for transmitting the external signal for controlling the control device in response to a second control signal from the input/output circuit; and
   a second output circuit that converts the response information from the condition-controlling -information generating circuit into a second electrical signal and outputs the second electrical signal, wherein
   the diagnosis-information recording/displaying device receives the electrical signal from the input circuit via the second power-supply pin and/or the second ground pin included in the second general-purpose interface, and outputs the second electrical signal output from the second output circuit via the second power-supply pin and/or the second ground pin included in the second general-purpose interface.

* * * * *